United States Patent [19]

Fuoco et al.

[11] Patent Number: 5,630,078
[45] Date of Patent: May 13, 1997

[54] PERSONAL COMPUTER WITH PROCESSOR RESET CONTROL

[75] Inventors: Daniel P. Fuoco; Luis A. Hernandez; Eric Mathisen, all of Boca Raton; Dennis L. Moeller, Delray Beach, all of Fla.; Jonathan H. Raymond, Essex Junction, Vt.; Esmaeil Tashakori, Delray Beach, Fla.

[73] Assignee: International Business Machines Corporation, Armonk, N.Y.

[21] Appl. No.: 262,397

[22] Filed: Jun. 20, 1994

Related U.S. Application Data

[63] Continuation of Ser. No. 706,490, May 28, 1991, abandoned.

[51] Int. Cl.$^6$ ........................................... G06F 13/14
[52] U.S. Cl. ........................ 395/309; 395/308; 395/293
[58] Field of Search ........................... 395/293, 306, 395/308, 294, 296, 297, 309, 282, 283, 750, 775

[56] References Cited

U.S. PATENT DOCUMENTS

| | | | |
|---|---|---|---|
| 4,768,162 | 8/1988 | Nishimura | 395/750 |
| 4,787,032 | 11/1988 | Culley | 395/725 |
| 4,788,661 | 11/1988 | Morita | 395/750 |
| 5,007,014 | 4/1991 | Nishimura | 395/750 |
| 5,125,088 | 6/1992 | Culley | 395/550 |
| 5,148,380 | 9/1992 | Lin et al. | 364/707 |
| 5,170,481 | 12/1992 | Begun et al. | 395/725 |

*Primary Examiner*—Glenn A. Auve
*Attorney, Agent, or Firm*—Daniel E. McConnell

[57] ABSTRACT

This invention relates to personal computers, and more particularly to personal computers in which capability is provided for continuance of processing through an occurrence of a RESET signal while avoiding systems failures. The personal computer system has a high speed local processor data bus; an input/output data bus; a resettable microprocessor coupled directly to the local processor bus; and a bus interface controller coupled directly to the local processor bus and directly to the input/output data bus for providing communications between the local processor bus and input/output data bus. The bus interface controller provides for arbitration among devices directly coupled to the input/output data bus for access to the input/output data bus and to the local processor bus and for arbitration among the input/output data bus and the microprocessor for access to the local processor bus. The bus interface controller further recognizes receipt of a reset signal intended to initiate a reset of the microprocessor and defers delivery of a reset signal to until the bus interface controller has barred access to the local processor bus and input/output bus by any of the devices potentially requesting such access.

12 Claims, 5 Drawing Sheets

PERSONAL COMPUTER WITH PROCESSOR RESET CONTROL

RELATED APPLICATION

This application is a continuation of application Ser. No. 07/706,490 filed 28 May 1991, now abandoned, the priority of which is claimed.

FIELD AND BACKGROUND OF DISCLOSURE

This invention relates to personal computers, and more particularly to personal computers in which capability is provided for continuance of processing through an occurrence of a RESET signal while avoiding system failures.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. In the beginning, the Family I models typically used the popular INTEL 8088 or 8086 microprocessor as the system processor. These processors have the ability to address one megabyte of memory. Later Family I models and the Family II models typically use the higher speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

In all such personal computers using INTEL X86 microprocessors, the microprocessor serving as the system CPU may be reset by an appropriate RESET signal, issued on initial power-up of the system or under certain operating conditions (and in the latter instance sometimes known as a HOTRESET signal). Reset of an X86 processor terminates any operation in progress and returns the processor to a known state. Abnormal termination of a cycle in progress can give rise to failures in operation of the computer system for several different reasons. This is particularly true where the computer system is an advanced system such as one of the Family II systems described above. For example, if a RESET signal is received by a microprocessor while the microprocessor has also received a HOLD signal, then the microprocessor's responding hold acknowledge signal (HLDA) may be dropped or lost, upsetting the normal flow of processing by the system. Similarly, receipt of a HOLD during a reset interval triggered by a RESET may get an early HLDA which would then be lost having the same effect as the first error mentioned above. A RESET received during an active bus cycle may cause truncation of the bus cycle, again causing system errors such as leaving a slave device in an unrecoverable state. Finally, if the system involved is one which accommodates alternate masters on the local processor bus, then receipt of a RESET by the default system processor (normally the CPU) will cause the processor to acquire the local bus on resetting regardless of the status of the local processor bus with regard to alternate masters.

Such problems with Intel X86 processors have been recognized heretofore. One solution has been proposed in Culley U.S. Pat. No. 4,787,031 issued 22 Nov. 1988 and assigned to Compaq Computer Corporation, where any RESET signal is required to wait until any pending microprocessor HOLD signal is serviced. However, this proposed solution still suffers from the likelihood that a HLDA signal may be lost, cycle truncation will occur, or unnecessary contention between the default master and alternate masters may leave portions of the system in an indeterminate state.

BRIEF DESCRIPTION OF THE INVENTION

With the foregoing in mind, it is an object of this invention to assure that orderly processing continues even though a RESET signal may be received which would otherwise potentially result in disruption of normal processing. In realizing this object of the present invention, provision is made for recognizing the arrival of a RESET signal, confirming the status of the microprocessor and the related local processor bus, and effectuating the RESET signal only when doing so will permit continuance of normal processing flow.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
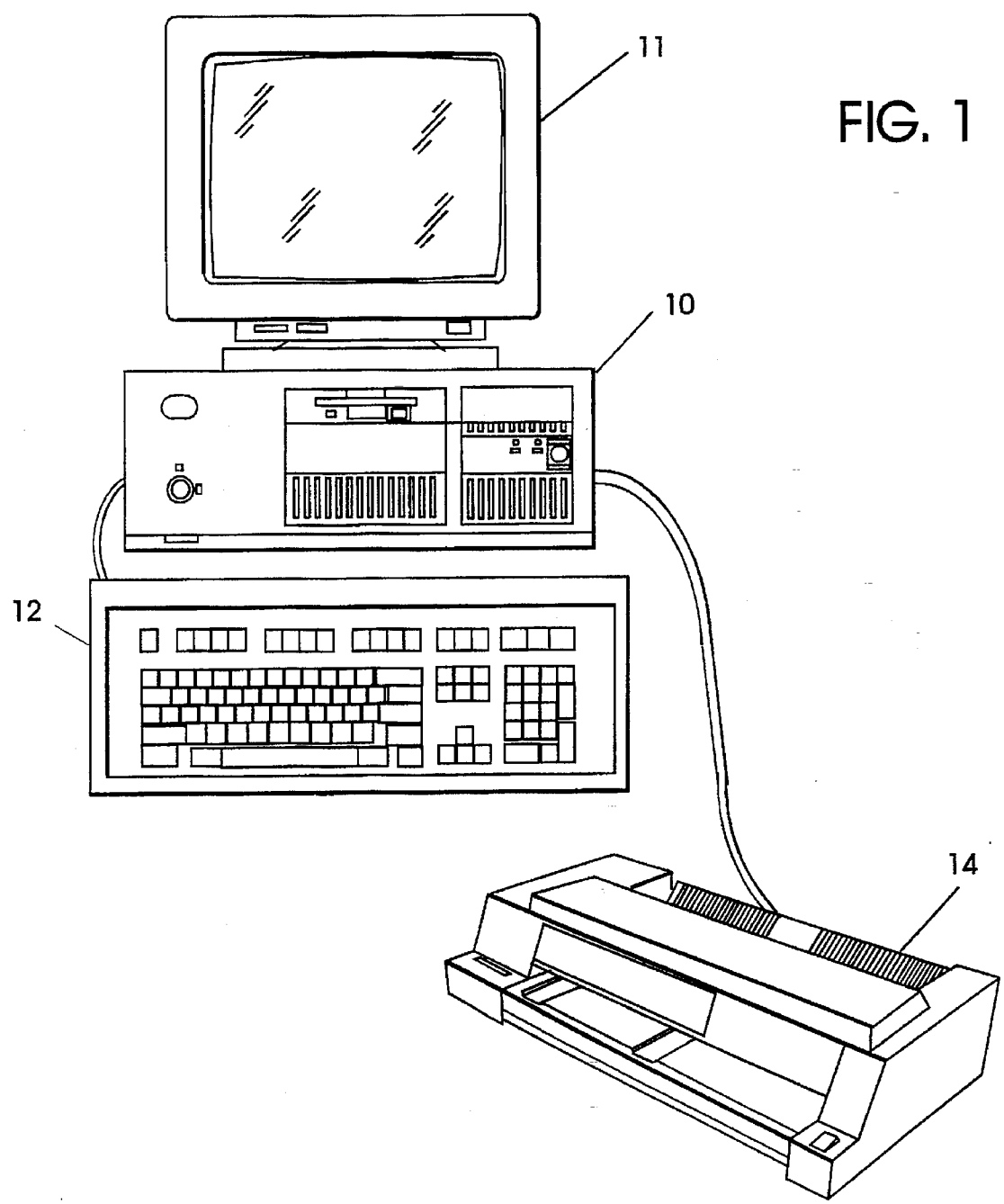
FIG. 1 is a perspective view of a personal computer embodying this invention.
Figure 2:
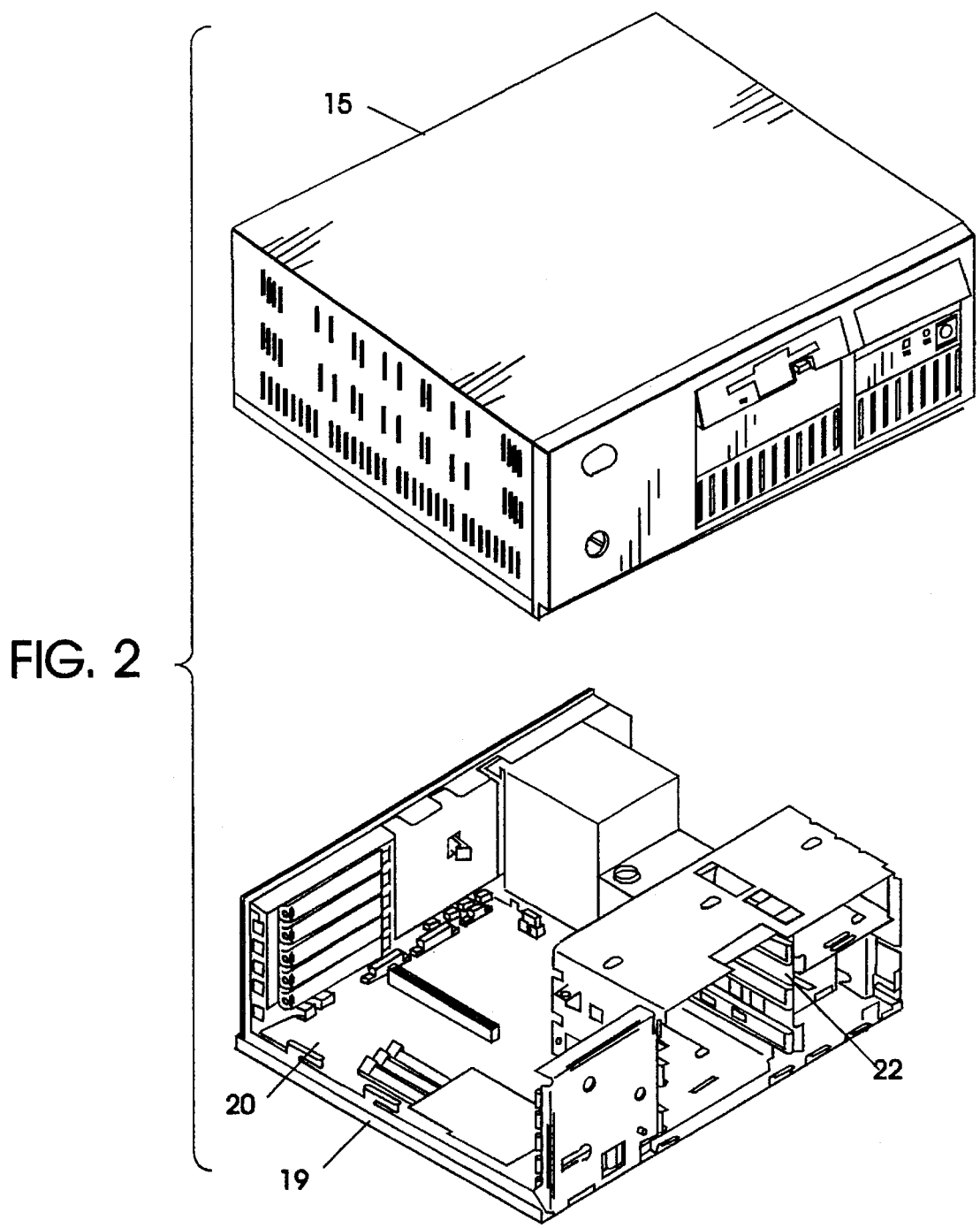
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
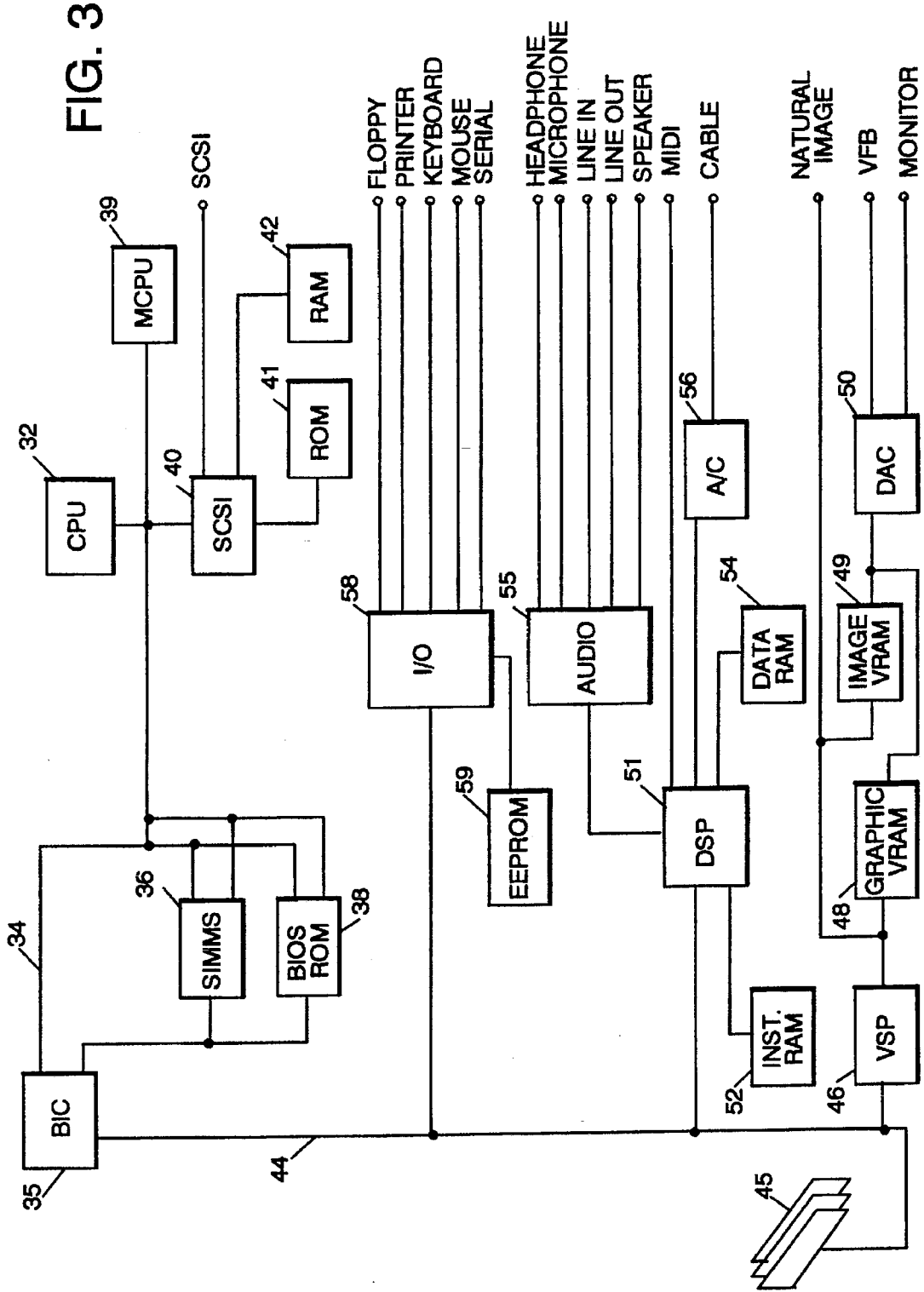
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80486 microprocessor.

Returning now to FIG. 3, the CPU local bus 34 (comprising data, address and control components) also provides for the connection of the microprocessor 32 with a numeric or math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44 and functions as a protocol translator, memory controller and DMA controller among other functions. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. The I/O bus 44 may be configured to bus specifications other than the MICRO CHANNEL specification.

Coupled along the I/O bus 44 are a variety of I/O components such as a video signal processor 46 which is associated with video RAM (VRAM) for storing character based information (indicated at 48) and for storing graphic or image based information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

Before turning in greater detail to a description of the functions provided for the personal computer 10, it is appropriate to first consider the support by a personal computer of what have been known as multiple masters or bus masters. As here used, a "master" is a processor or any circuit designed to gain control over a bus and drive address, data and control signals on the bus. Having such capability enables a master device to transfer information between system memory and other devices.

It has been proposed that masters be divided among three types—system master (usually the CPU), DMA controller, and bus master. The system master controls and manages the system configuration. It is usually the default master in the system. The default master owns the bus when no other master requires it. A DMA master is a special type of master which transfers data between DMA slaves and memory slaves, and does not arbitrate for the bus but services the DMA slave that is the arbitrator. As here used, a bus master arbitrates for use of the bus and supports information transfers with an I/O slave or memory slave.

What makes a device a "bus master" can be confusing, as bus masters do not necessarily require a processor. Also, a bus master may be called on to respond as a slave when accessed by another bus master. A bus master is distinguished by the capability of gaining control of the bus through arbitration and controlling the execution of a defined bus cycle. Generally, there are three types of bus masters: full function, special function controllers, and programmable special function controllers. The fundamental differences among them are degrees of flexibility, function and cost. The full function bus master is the most flexible, has the most function, and costs most. Typically, a full function bus master will have its own programmable CPU and be capable of controlling all system resources, including operating system software. Special function controllers have the least flexibility, function and cost. Typically, a special function controller will use logic circuits but no CPU to perform a specific function while requiring little or no assistance from other masters. Programmable special function controllers span the range between the other two. The fundamental difference between special function and programmable special function controllers is the ability to modify the function and/or execution characteristics of the bus master. Such modification can be accomplished through use of processing units or through settable registers.

Within the definitions here given, the CPU 32 and SCSI controller 40 may function as masters directly coupled to or on the local bus 34, while the I/O controller 58, DSP 51, VSP 46 and possibly accessory boards 45 mounted in the MICRO CHANNEL slots may all function as masters directly coupled to or on the input/output bus 44.

Figure 4:
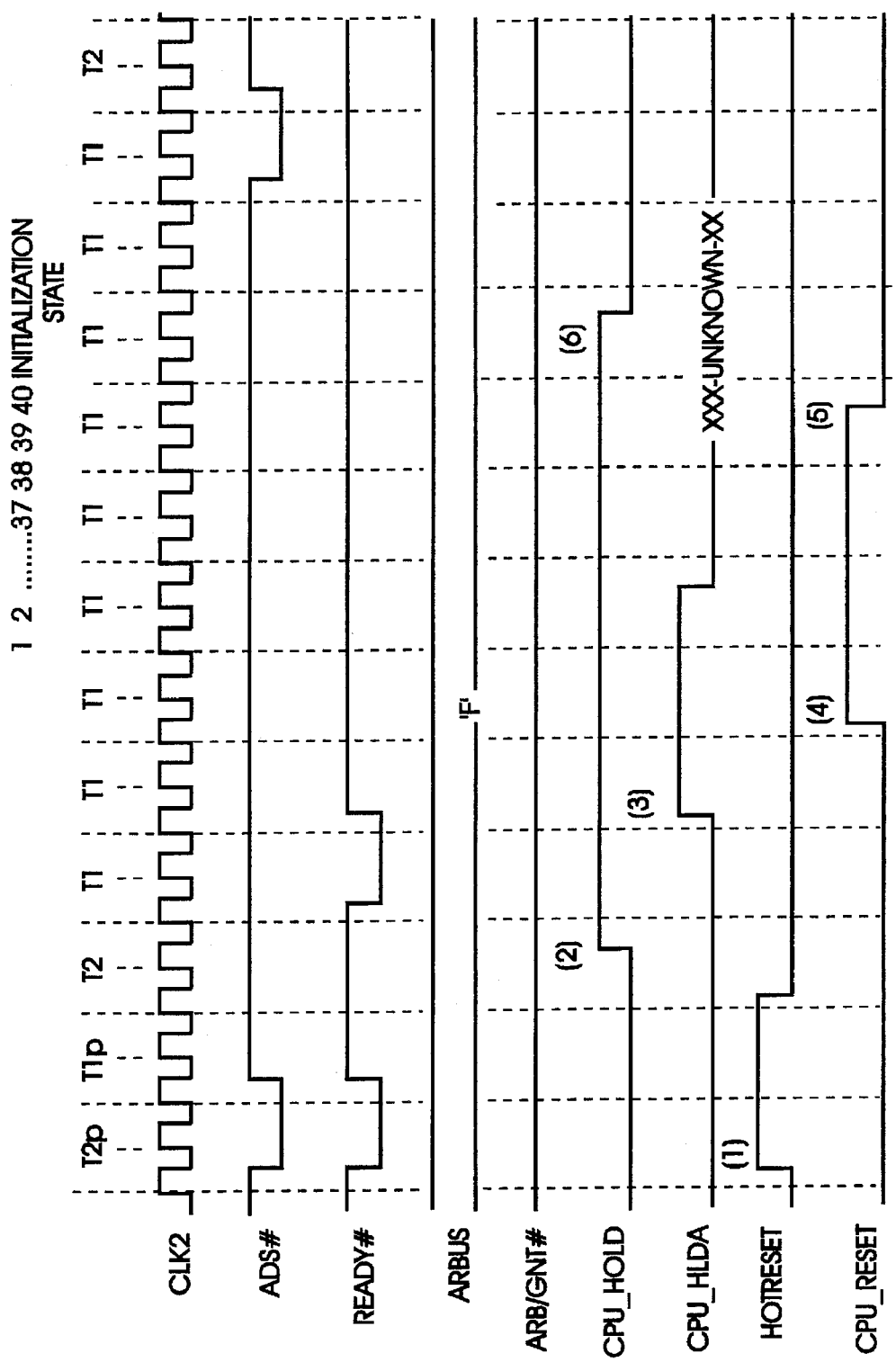
FIGS. 4 and 5 are signal charts illustrating operation of the personal computer of FIG. 3 when a reset signal is generated in accordance with the present invention.
Figure 5:
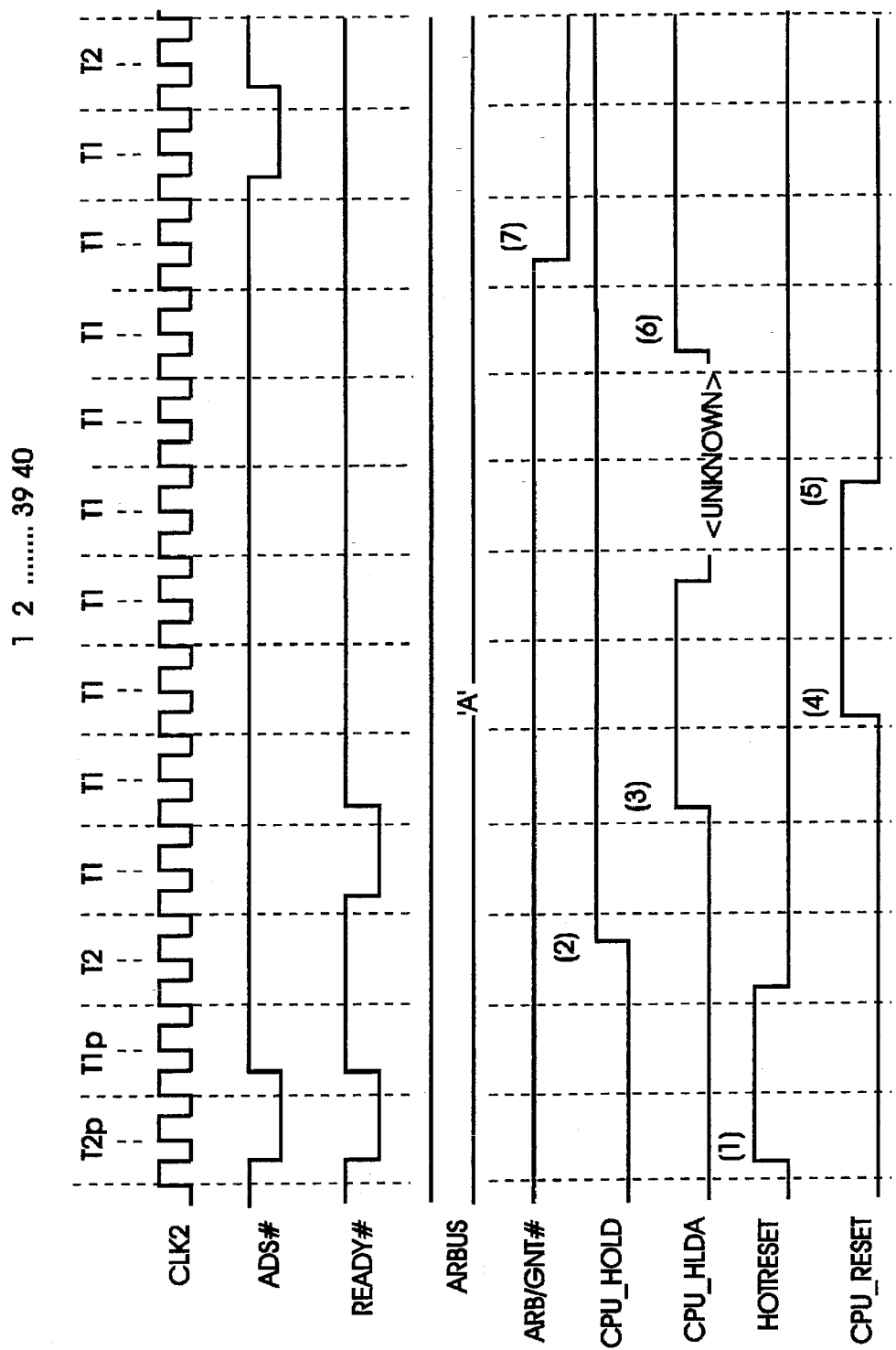

In accordance with this invention, a signal known here as an X86 RESET or CPU_RESET signal will be generated by the BIC 35 in response to a reset condition, and only after the BIC 35 has gained control of the local processor bus 34 and the input/output bus 44. The reset conditions here referred to include a shutdown cycle (as defined in relevant technical materials related to the Intel 80286, 80386 and 80496 microprocessors) and a HOTRESET signal. HOTRESET is a signal name used to refer to a software generated signal indicating a need to return the processor to a known state. The bus interface controller 35 recognizes receipt of a reset signal intended to initiate a reset of the CPU microprocessor 32 and defers delivery of a reset signal to the microprocessor until the bus interface controller has barred access to the local processor bus 34 and the input/output bus 44 by any of the devices potentially requesting such access. As disclosed in greater detail in application Ser. No. 706,602 filed 28 May 1991, now abandoned, and owned in common with the present subject invention, the BIC 35 functions as a central arbitration control point (CACP) for the I/O bus 44 by the exchange of certain signals with that bus (ARBUS0, 1,2,3; PREEMPT#; and BURST#) and also functions as a local bus arbitration control point (LBACP) by the exchange of certain signals with the CACP, the I/O bus 44 and the masters directly connected to local processor bus 34 (ARBUS0,1,2,3; PREEMPT#; BURST#; BRQ1# through BRQn#; BGT1# through BGTn#; CACP_HOLD; CACP_HLDA; CPU_HOLD; and CPU_HLDA). Certain of these signals are represented in FIGS. 4 and 5, where illustrative sequences of operation for the personal computer 10 in accordance with this invention are shown. In each of the diagrams of FIGS. 4 and 5, the passage of time is indicated by the clock cycles on the line CLK2. To any extent necessary for a full understanding of the present invention, the aforementioned co-pending application is incorporated by reference into the present description.

In the sequence of FIG. 4, a HOTRESET has been requested (at a first point indicated at 1) and is pending while a default master controls the input/output bus 44. In that event, the BIC 35 drives the CPU_HOLD signal active at a second point indicated at (2). The processor then relinquishes the bus with issuance of an acknowledge signal CPU_HLDA at a third point (3), preparing the BIC 35 to service the pending RESET request. CPU_RESET is then driven active by the BIC 35, and the reset procedure is active for forty cycles of CLK2 (indicated between fourth and fifth points 4 and 5). On completion of the reset procedure, the system reaches an initialization state and the BIC 35 drives CPU_HOLD inactive if no bus master request is pending.

The sequence of FIG. 5 illustrates the receipt of a HOTRESET signal during an arbitration cycle. As indicated at a first point (1), HOTRESET is requested by the system while ARB/GNT# is high or active. CPU_HOLD is thereafter driven active at a second point (2) and the processor thereafter relinquishes the bus at a third point (3). CPU_RESET is then driven active by the BIC 35 for forty periods of CLK2 (between fourth and fifth points 4 and 5) and, after internal initialization, the processor enters a hold state at a sixth point (6). The CACP function of the BIC 35 is then free, at a seventh point (7), to grant the bus to a requesting input/output master.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:

a high speed local processor data bus;

an input/output data bus;

a resettable microprocessor coupled directly to said local processor bus; and a bus interface controller coupled directly to said processor bus and directly to said input/output data bus for providing communications between said local processor bus and said input/output data bus, said bus interface controller providing for arbitration among said resettable microprocessor and any other master devices coupled directly to said local processor bus for access to said local processor bus, and providing for arbitration among said local processor bus and any devices coupled directly to said input/output data bus for access to said input/output data bus, said bus interface controller further recognizing receipt at said bus interface controller of a reset signal (HOTRESET) intended to initiate a reset of said microprocessor and delaying generation of a reset signal (CPU_RESET) to said microprocessor until after said bus interface controller has gained control of said local processor bus and said input/output bus from all of the devices and said microprocessor by the exchange of hold and hold acknowledge signals (CPU_HOLD and CPU_HLDA).

2. A personal computer according to claim 1 wherein said bus interface controller responds to receipt of a reset signal by capturing control of said input/output bus and said local processor bus.

3. A personal computer according to claim 2 wherein said bus interface controller responds to receipt of a reset signal during an interval when said microprocessor controls said input/output bus and said local processor bus by issuing a hold signal to the microprocessor and awaiting release of said input/output bus and said local processor bus by said microprocessor.

4. A personal computer according to claim 2 wherein said bus interface controller responds to receipt of a reset signal during an interval when a device coupled directly to said input/output data bus controls said input/output bus and said local processor bus by issuing a hold signal to the microprocessor and awaiting release of said local processor bus by said microprocessor.

5. A personal computer system comprising:

a high speed data bus;

an input/output data bus;

a resettable microprocessor coupled to said high speed data bus;

volatile memory coupled to said high speed data bus for volatile storage of data;

storage memory devices;

a storage controller coupled to said high speed data bus and to said storage memory devices for regulating communications with said storage memory devices; and a bus interface controller coupled to said high speed data bus and to said input/output data bus for providing communications between said high speed data bus and said input/output data bus, said bus interface controller providing for arbitration between said resettable microprocessor and said storage controller for access to said high speed data bus, and providing for arbitration among said high speed data bus and any devices coupled directly to said input/output data bus for access to said input/output data bus, said bus interface controller further recognizing receipt at said bus interface controller of a reset signal (HOTRESET) intended to initiate a reset of said microprocessor and delaying generation of a reset signal (CPU_RESET) to said microprocessor until after said bus interface controller has gained control of said high speed data bus and said input/output bus from all of the devices and said microprocessor and said storage controller by the exchange of hold and hold acknowledge signals (CPU_HOLD and CPU_HLDA).

6. A personal computer according to claim 5 wherein said bus interface controller responds to receipt of a reset signal by capturing control of said input/output bus and said high speed data bus.

7. A personal computer according to claim 6 wherein said bus interface controller responds to receipt of a reset signal during an interval when said microprocessor controls said input/output bus and said high speed data bus by issuing a hold signal to the microprocessor and awaiting release of said input/output bus and said high speed data bus by said microprocessor.

8. A personal computer according to claim 6 wherein said bus interface controller responds to receipt of a reset signal during an interval when a device coupled directly to said input/output data bus controls said input/output bus and said high speed data bus by issuing a hold signal to the microprocessor and awaiting release of said high speed data bus by said microprocessor.

9. A personal computer system comprising:

a high speed data bus;

a microprocessor coupled directly to said high speed data bus;

a numeric co-processor coupled directly to said high speed data bus;

volatile memory coupled directly to said high speed data bus for volatile storage of data;

storage memory devices for nonvolatile storage of data;

a storage controller coupled directly to said high speed data bus and to said storage memory devices for regulating communications with said storage memory devices;

an input/output data bus;

an input/output controller coupled directly to said input/output data bus;

a digital signal processor coupled directly to said input/output data bus;

a video signal processor coupled directly to said input/output data bus; and a bus interface controller coupled to said high speed data bus and to said input/output data bus for providing communications between said high speed data bus and said input/output data bus, said bus interface controller providing for arbitration among said microprocessor and said storage controller coupled directly to said high speed data bus for access to said high speed data bus, and providing for arbitration among said input/output controller and said digital signal processor and said video signal processor coupled directly to said input/output data bus and said high speed data bus for access to said input/output data bus, said bus interface controller further recognizing receipt at said bus interface controller of a reset signal (HOTRESET) intended to initiate a reset of said microprocessor and delaying generation of a reset signal (CPU_RESET) to said microprocessor until after said bus interface controller has gained control of said high speed data bus and said input/output bus from all of said microprocessor and said storage controller and said input/output controller and said digital signal processor and said video signal processor by the exchange of hold and hold acknowledge signals (CPU_HOLD and CPU_HLDA).

10. A personal computer according to claim 9 wherein said bus interface controller responds to receipt of a reset signal by capturing control of said input/output bus and said high speed data bus.

11. A personal computer according to claim 10 wherein said bus interface controller responds to receipt of a reset signal during an interval when said microprocessor controls said input/output bus and said high speed data bus by issuing a hold signal to the microprocessor and awaiting release of said input/output bus and said high speed data bus by said microprocessor.

12. A personal computer according to claim 10 wherein said bus interface controller responds to receipt of a reset signal during an interval when a device coupled directly to said input/output data bus controls said input/output bus and said high speed data bus by issuing a hold signal to the microprocessor and awaiting release of said high speed data bus by said microprocessor.

* * * * *